FIG. 1A

Jan. 31, 1956    J. LYMAN ET AL    2,733,437
RADIO APPARATUS FOR DETECTING AND LOCATING OBJECTS
Filed Aug. 12, 1941    7 Sheets-Sheet 2

INVENTORS
JOSEPH LYMAN
JOE J. CALDWELL, JR.
ABBOTT S. MAEDER
ROBERT O. HAXBY
GERELD L. TAWNEY

BY *Arthur H. Serrell*
THEIR ATTORNEY

Jan. 31, 1956 J. LYMAN ET AL 2,733,437
RADIO APPARATUS FOR DETECTING AND LOCATING OBJECTS
Filed Aug. 12, 1941 7 Sheets-Sheet 3

INVENTORS
JOSEPH LYMAN
JOE J. CALDWELL, JR.
ABBOTT S. MAEDER
ROBERT O. HAXBY
GERELD L. TAWNEY

BY Arthur H. Serrell
THEIR ATTORNEY

Jan. 31, 1956 J. LYMAN ET AL 2,733,437
RADIO APPARATUS FOR DETECTING AND LOCATING OBJECTS
Filed Aug. 12, 1941 7 Sheets-Sheet 4

INVENTORS
JOSEPH LYMAN
JOE J. CALDWELL, JR.
ABBOTT S. MAEDER
ROBERT O. HAXBY
GERELD L. TAWNEY

BY Arthur H. Serrell

THEIR ATTORNEY

United States Patent Office 2,733,437
Patented Jan. 31, 1956

2,733,437

RADIO APPARATUS FOR DETECTING AND LOCATING OBJECTS

Joseph Lyman, Huntington, Joe J. Caldwell, Jr., Merrick, Abbott S. Maeder, East Hempstead, and Robert O. Haxby and Gereld L. Tawney, Hempstead, N. Y., assignors to Sperry Rand Corporation, a corporation of Delaware Application August 12, 1941, Serial No. 406,494

7 Claims. (Cl. 343—11)

The present invention relates, generally, to the use of ultra high frequency electromagnetic radiation for detecting and locating objects such as targets or obstacles on the water, in the air, etc., and the invention has reference, more particularly, to, a novel apparatus for accomplishing this purpose.

In Patent No. 2,231,929 of Joseph Lyman, one of the inventors herein, there is disclosed a tridimensional radio direction indicator employing ultra high frequency waves for determining the bearings of remote objects in azimuth and elevation. The present invention discloses novel apparatus that not only gives the information provided for by the above patent but also furnishes additional information whereby more complete position data of objects or targets is made available, such as the range.

The principal object of the present invention is to provide a novel apparatus employing ultra high frequency radio scanning means together with intermittently operating transmitter and receiving means and indicator means controlled therefrom for giving the angular position or positions and distance or slant range of the remote object or target scanned.

Application Serial No. 754,420 filed in the names of Joe J. Caldwell, Jr., Abbott S. Maeder, deceased, and Robert O. Haxby, on June 13, 1947, for Protective Apparatus for Object Locating Systems, is a continuation-in-part of the present application, and claims the means shown herein for preventing the direct output of the ultra high frequency transmitter from being picked up by the receiver or connected circuits, while permitting signals reflected from the remote object or target to be received by the receiver for use in producing proper data indications.

Application Serial No. 780,160 filed in the names of Joseph Lyman and Joe J. Caldwell, Jr., on October 16, 1947, for Radio Apparaus for Detecting and Locating Objects, is a divisional of the present application and claims the novel scanning means shown herein employing an oscillatable reflector and a connected spring arrangement, the reflector being oscillated through desired scanning angles at the resonant frequency or frequencies of the oscillating system, thereby obtaining optimum ease and smoothness of operation.

Still another object of the present invention is to provide an object detecting and position data indicating system employing a pulse generator designed for triggering an ultra high frequency transmitter so that the latter emits intermittently, the said pulse generator also serving to trip or trigger off an ultra high frequency receiver when the direct pulse is being transmitted, cathode ray indicator means being controlled from said receiver and pulse generator for indicating the desired position data.

Other objects and advantages will become apparent from the specification, taken in connection with the accompanying drawings wherein the invention is embodied in concrete form.

Figure 1A:
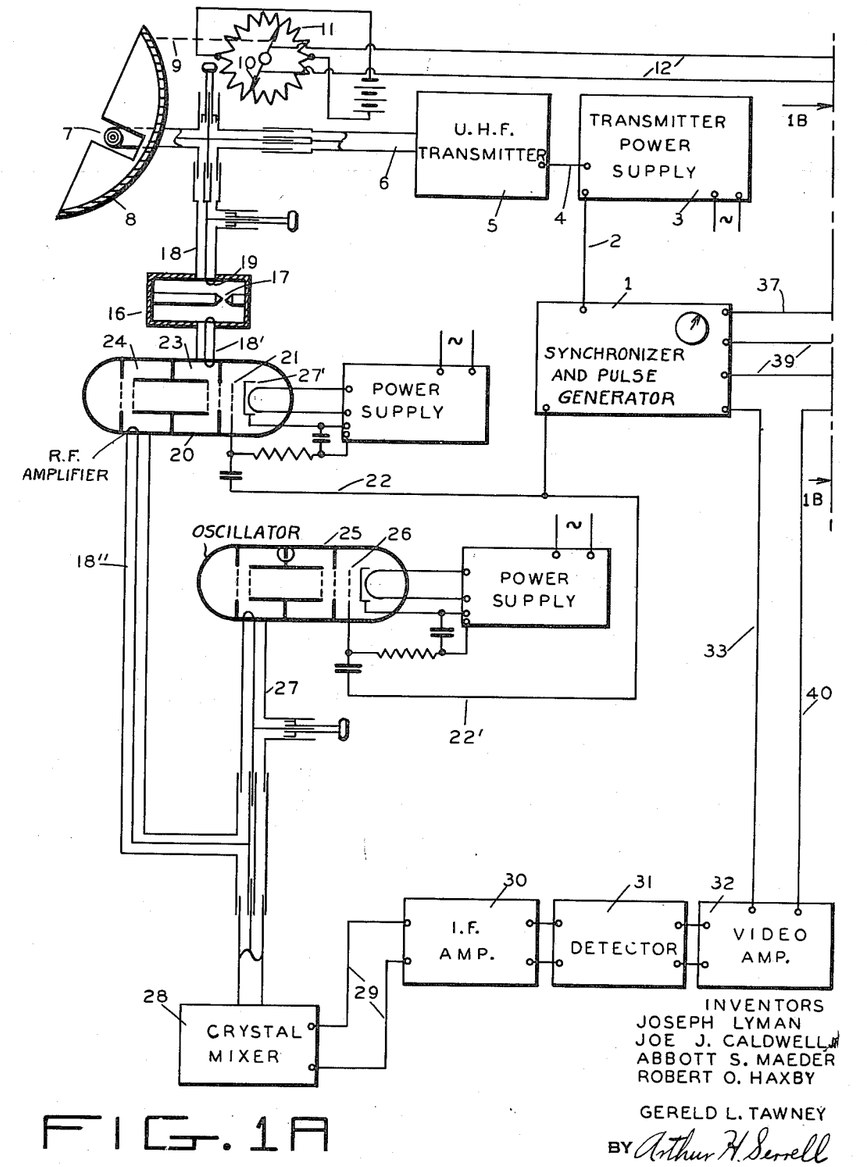
Figs. 1A and 1B is a schematic wiring diagram of one application of the apparatus of the present invention.
Figures 1B, 2, 3:
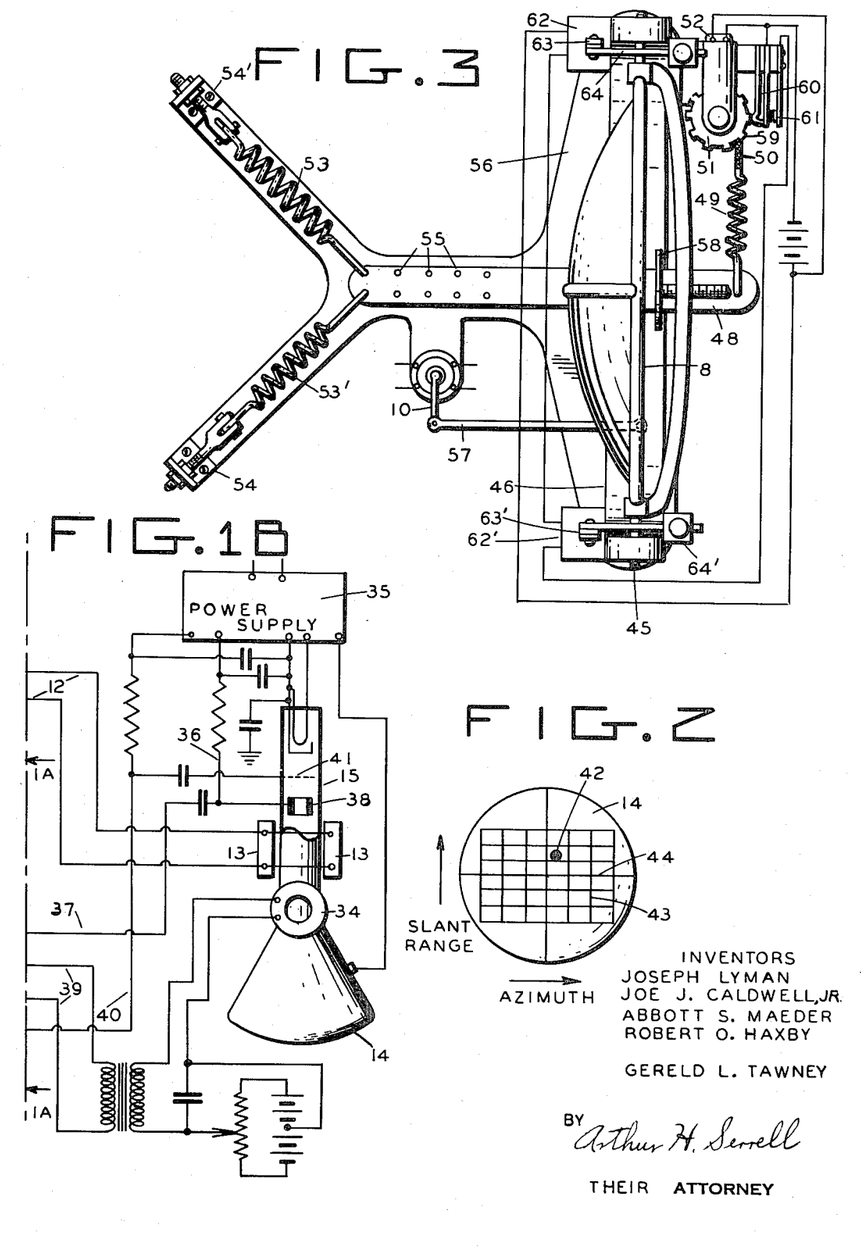
Fig. 2 is a face view of the indicator shown in Fig. 1B.
Fig. 3 is a plan view of the scanning antenna-reflector used.
Figure 10:
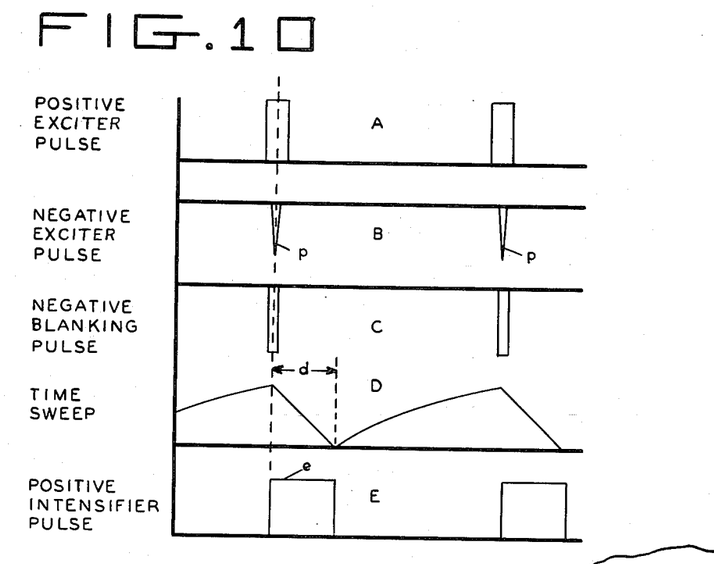
Fig. 10 illustrates the pulse outputs of the pulse generator and power supply.

Referring now to Figs. 1A and 1B of the drawings, the reference numeral 1 is a synchronizer and pulse generator adapted to generate various forms of pulses as of the types shown in Fig. 10 of the drawings. Thus, this synchronizer and pulse generator supplies intermittent positive pulses as shown in graph A of Fig. 10 over the lead 2 to the power supply 3 causing this power supply to furnish negative pulses as shown in graph B of Fig. 10 over lead 4 to an ultra high frequency oscillator 5 which may be of the magnetron type thereby biasing this oscillator on momentarily at regularly recurring intervals upon the occurrence of each of the peaks $p$ of graph B in Fig. 10 so that this oscillator supplies ultra high frequency energy of the order of 3,000 megacycles, for example, intermittently through the concentric line 6 to the radiating antenna 7. The concentric line 6 is shown adjustable as to length for varying the line characteristics. The frequency of the peaks in graphs A and B of Fig. 10 will depend upon the distance desired to be scanned by the apparatus. Thus, if the frequency of these peaks is made 2,000 cycles per second, for example, sufficient time will be permitted for picking up objects up to substantially 50 miles away.

The antenna 7 is shown provided with a parabolic reflector 8 rendering the same directional which reflector is adapted to be oscillated through a desired azimuthal scanning angle of, for example, 30 degrees by apparatus to be further described. Such oscillations of the reflector 8 are connected through mechanism 9 to effect a corresponding movement of a potentiometer handle 10 moving over potentiometer 11, thereby supplying scanning potentials to leads 12 connected to the transverse deflecting coils 13 (see Fig. 1B) of an indicator 15 of the cathode ray type. Thus, as reflector 8 oscillates back and forth scanning in azimuth, the cathode ray beam, were the same turned on, would correspondingly scan across the cathode ray tube face 14.

The antenna 7 not only serves to transmit the ultra high frequency energy intermittently but also serves to receive such energy as is reflected from a remote scanned object. In order to prevent the transmitted pulse from directly affecting the receiver suitable blocking means are employed. Such means comprises initially a concentric line resonator 16 having a spark gap 17 which resonator is inserted in the transmission line 18 connecting the antenna 7 to the receiver. Transmission line 18 is of such length that with spark gap 17 passing current, the impedance of the line at its junction with line 6 is a maximum. In practice this line 18 may be one-quarter wave length or any odd multiple thereof in length.

When the powerful high frequency pulse from oscillator 5 passes along line 6 to antenna 7 a portion of this energy will pass into line 18 and acting through coupling loop 19 will tend to set up a strong electromagnetic oscillation within resonator 16. This will cause spark gap 17 to break down thereby damping such oscillation so that but little or no energy is fed through connected line 18' coupled to an ultra high frequency tube 20 of the type disclosed in Patent No. 2,242,275 of R. H. Varian, commonly known as Klystron. This tube 20 is adapted to serve as an amplifier of the received signals and acts to block the direct signal from reaching the receiver. This blocking action is accomplished by supplying the grid 21 of the tube 20 with a negative pulse over line 22 from generator 1 which pulse is fed simultaneously with the supply of the positive pulse over line 2 by this generator to the ultra high frequency power supply 3. The negative blocking or blanking pulse supplied over line 22 is shown at C in Fig. 10. Thus, when the transmitter 5 sends out a pulse of ultra high frequency energy, not only does spark gap 17 of resonator 16 break down to prevent transmission of this pulse along line 18 but also the cathode ray beam of tube 20 is biased off so that there is no coupling between resonators 23 and 24 of the tube 20 and hence no energy is supplied at this time through line 18" connected with resonator 24. Line 18' is made of variable length in order that maximum received power is transferred to resonator 23.

The receiver shown is of the superheterodyne type employing a local ultra high frequency oscillator 25 of the type disclosed in the above-mentioned patent of R. H. Varian. To further insure the blocking of the transmitted pulse from directly affecting the receiver, the negative pulse supplied over line 22 is also supplied through line 22' to the grid 26 of oscillator 25, thereby blocking the electron beam of this oscillator so that the same does not deliver energy to output line 27 during the transmission of energy by oscillator 5 and antenna 7.

However, when high frequency energy reflected by the remote object or target is received by antenna 7 this received energy is relatively weak compared to the preceding output of oscillator 5 so that this received energy sets resonator 16 into oscillation, this oscillation being insufficiently strong to break down gap 17 and hence the signal is not damped by this gap so that the standing electromagnetic waves within resonator 16 are supplied through the coupling loops shown and concentric line 18' to the "buncher" resonator 23 of ultra high frequency tube 20. Thus, oscillating standing waves are set up in resonator 23 at the frequency of the received signal which serves to effect recurrent bunching of the electron beam emitted from cathode 27' so that such bunched beam energizes resonator 24 and effects the delivery of energy through the loops shown to concentric line 18" connected with line 27 and with crystal mixer 28 which may be of the type disclosed in application Serial No. 394,239 of F. L. Salisbury, now Patent No. 2,406,405, or of any known type.

It will be noted that when the received signal reaches tube 20, the negative bias has been removed from its grid 21 so that this tube is free to operate. This tube may be made to amplify the signal received, if desired, by merely adjusting the beam current and accelerating voltage to accomplish this result. Assuming that the output frequency of the transmitter oscillator 5 is 3,000 megacycles, the local oscillator 25 (which may also be of the Klystron type) may have a frequency of 2,970 megacycles, for example, so that the difference frequency taken by the crystal mixer 28 and fed through output leads 29 will be of the order of 30 megacycles which beat frequency is fed to the intermediate frequency amplifier 30 which has a relatively wide band width since the oscillator transmitter 5 may put out a fairly wide band of frequencies and this oscillator as well as local oscillator 25 may shift in frequency due to temperature changes, etc. Thus, for example, an intermediate frequency amplifier 30 having a band width of 4 megacycles at approximately 30 megacycles has been found to be satisfactory in use. The output of amplifier 30 is supplied to a second detector 31 the output of which in turn is supplied to a video amplifier 32 which may have a band width of from 2 kilocycles to 4 megacycles, for example. To even further insure that the transmitted pulse does not directly affect the receiver the amplifier 32 is shown connected through lead 33 to the pulse generator 1 for receiving a blanking pulse of the type shown in A or C of Fig. 10 so that the amplifier 32 is blocked out when the transmitter is operating. If desired, the intermediate frequency amplifier 30 may comprise two cascade amplifiers operating at different frequencies with their associated frequency converter systems such that the overall response is the same as provided by amplifier 30.

The synchronizer and pulse generator 1 is also adapted to supply a timing voltage through leads 39 to the vertical deflecting coils 34 of tube 15 to produce a time sweep of the cathode ray beam, were the same turned on, this sweep being initiated at the instant the transmitted pulse leaves antenna 7. This sweep voltage is shown at D in Fig. 10, the portion of the sweep voltage curve being utilized for effecting the time sweep being shown between the points defined by d shown in connection with the voltage D. Actually, the cathode ray beam is normally biased off by a suitable bias supplied over lead 36 connected with power supply 35 but were this beam on it would describe two scanning movements, firstly, a transverse scanning movement due to voltage supplied from potentiometer 11, and secondly, an upward vertical scanning movement due to the time sweep voltage supplied from synchronizer and pulse generator 1. The back trace of this time sweep voltage, i. e., the downward movement of the beam, were the same on, is eliminated by use of an intensifier pulse voltage shown at E in Fig. 10. This intensifier voltage goes positive during the upward trace of the beam as shown at e in connection with voltage curve E and goes negative the remainder of the time, this intensifier voltage being applied through lead 37 to the accelerating electrode 38 of tube 15.

In operation, the transmitted pulses leaving antenna 7 do not directly affect the receiver. However, when reflected electromagnetic radiation is received by antenna 7 this is fed through resonator 16, blocking amplifier 20, mixed with the output of the local oscillator 25 in crystal mixer 28 passed through intermediate frequency amplifier 30 detected in detector 31 and further amplified in video amplifier 32, thereby causing this amplifier to deliver a positive pulse over output lead 40 to the control grid 41 of tube 15, thereby biasing this tube on momentarily to produce a spot such as 42 shown in Fig. 2. The transverse position of the spot with regard to the face 14 of the tube is indicative of the azimuthal angle of the object scanned and the vertical position of this spot is indicative of the slant range or distance to the object scanned, bearing in mind that the beam starts to move upwardly (were the same on) at the instant of sending the transmitted pulse. If desired, the tube face 14 may be provided with angular index lines 43 and with distance graduations 44.

Figure 4:
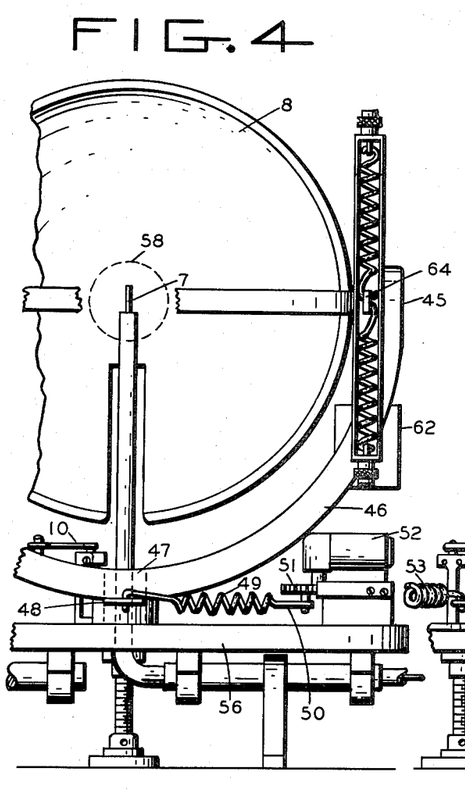
Fig. 4 is a fragmentary front elevational view of the structure of Fig. 3.
Figure 5:
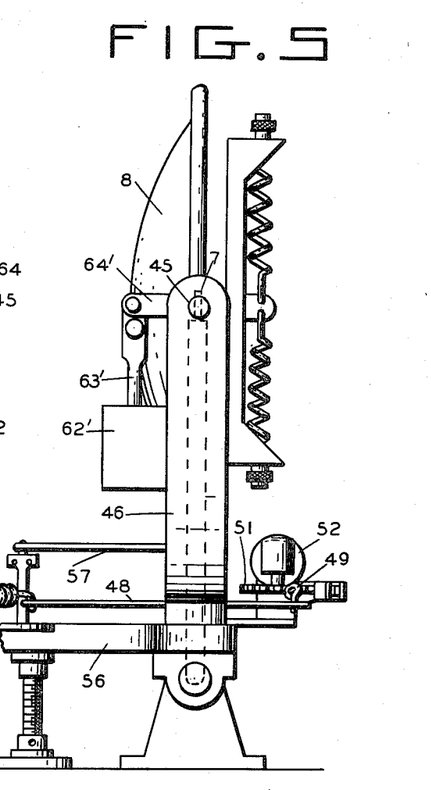
Fig. 5 is a view in side elevation of the structure of Fig. 4.

Figs. 3 to 5 show the reflector 8 and the apparatus for oscillating the same. This reflector is provided with transverse aligned trunnions 45, the axes of which trunnions pass through the focus of parabolic reflector 8, at which focus is located the antenna 7. The trunnions 45 are shown pivotally carried by a yoke 46 that in turn is pivoted at pivot 47 for vertical turning movement about the vertical axis of antenna 7. This yoke has a transverse bar 48 secured thereto, which bar is used to oscillate the yoke and hence the reflector 8. The portion of bar 48 projecting in front of the reflector 8 is connected through a tension spring 49 and cable 50 to a crank disc 51 driven through reduction gearing from a motor 52. In practice it has been found that the speed of motor 52 may be made such that the reflector 8 is oscillated from 60 to 200 cycles per minute depending upon the desired scanning speed. The portion of bar 48 extending to the rear of reflector 8 is shown connected to substantially opposed tension springs 53, 53' that are connected through adjustable anchors 54, 54' to the base of the apparatus. The rear portion of the bar 48 is shown having a series of holes 55 for enabling adjustment of the connection of springs 53, 53' to this bar. The tension of springs 49, 53 and 53' and the adjustment of these springs through use of anchors 54, 54' and holes 55 is made such that the oscillating system including the two springs, connecting bar 48, yoke 46 and reflector 8, is resonant at the desired frequency of oscillation. This condition of resonance eliminates the use of positive stopping means at the ends of the oscillating movements of reflector 8, and not only conserves energy by greatly reducing vibration and jarring of the supporting base 56 but also produces optimum scanning conditions. The potentiometer handle 10 is shown in Fig. 3 as being actuated by a rod 57 connected with the reflector 8. A disc-shaped reflector 58 is adjustably positioned in front of antenna 7 to prevent dispersion of the radiated energy.

If desired, the reflector 8 may also be oscillated about its transverse axis passing through trunnions 45 as where it is wished to enlarge the scanning area or where it is desired to provide an indication of the elevational angle of the object or objects scanned. This elevational scanning of the reflector would ordinarily take place at a much higher rate than the transverse scanning in order to effect multiple line scanning of the viewed area. This vertical scanning may be at a speed that has a fixed ratio with the rate of azimuthal scanning or it may be at a rate independent thereof. In Figs. 3 to 5 the vertical scanning rate is definitely tied in with the horizontal scanning rate by the apparatus about to be described. This apparatus comprises cam tooth projections 59 equally spaced about the periphery of crank disc 51 which projections intermittently engage a switch actuating lever 60 that serves to intermittently close contacts 61 connected to energize solenoids 62 and 62'. These solenoids in turn actuate plungers 63 and 63' connected through levers 64 and 64' for oscillating the reflector 8 about the horizontal axis, thereby effecting vertical scanning of the field of view. Inasmuch as the solenoids 62 and 62' are energized each time one of the tooth projections 59 passes under switch actuating lever 60 it will be noted that the rate of vertical scanning of the reflector bears a definite ratio to the rate of horizontal scanning. If desired, the vertical scanning may be accomplished through use of a motor similar to motor 52 and operating independently of motor 52 in which case there need not necessarily be a fixed ratio maintained between the horizontal and vertical scanning speeds.

Figure 9A:
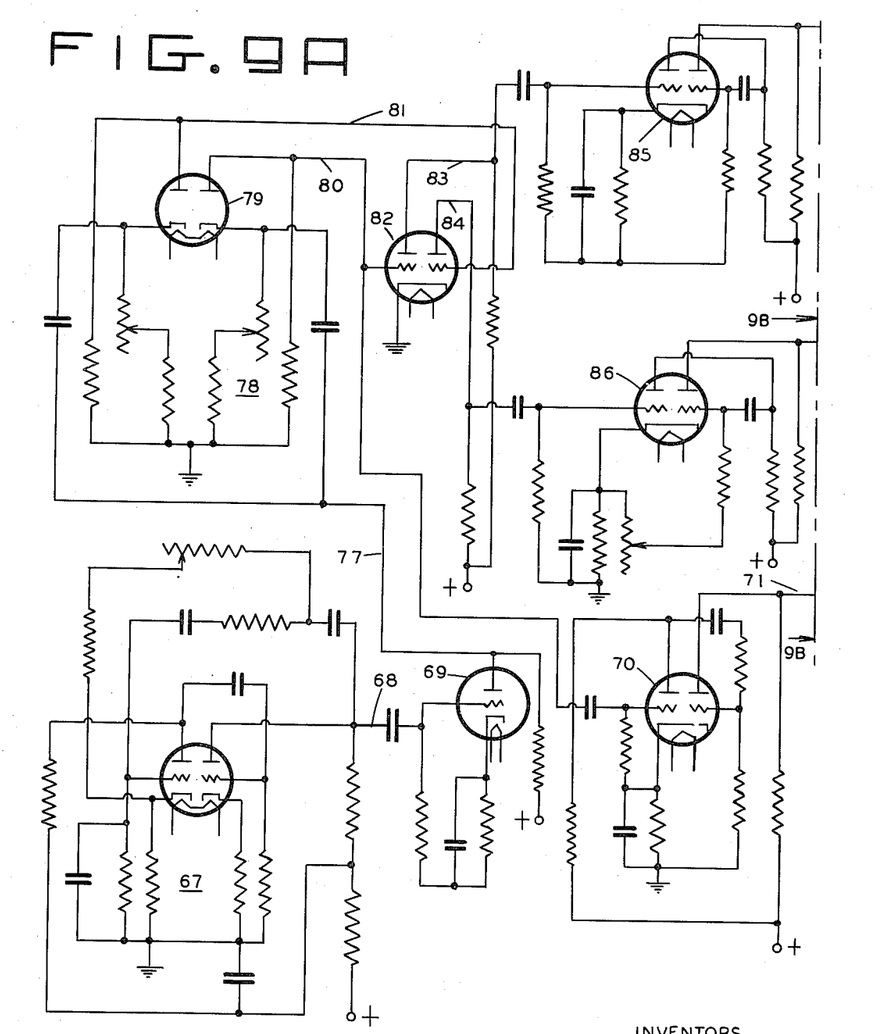
Figs. 9A and 9B are a wiring diagram of the pulse generator of the structure of Figs. 1A and 1B.
Figure 9B:
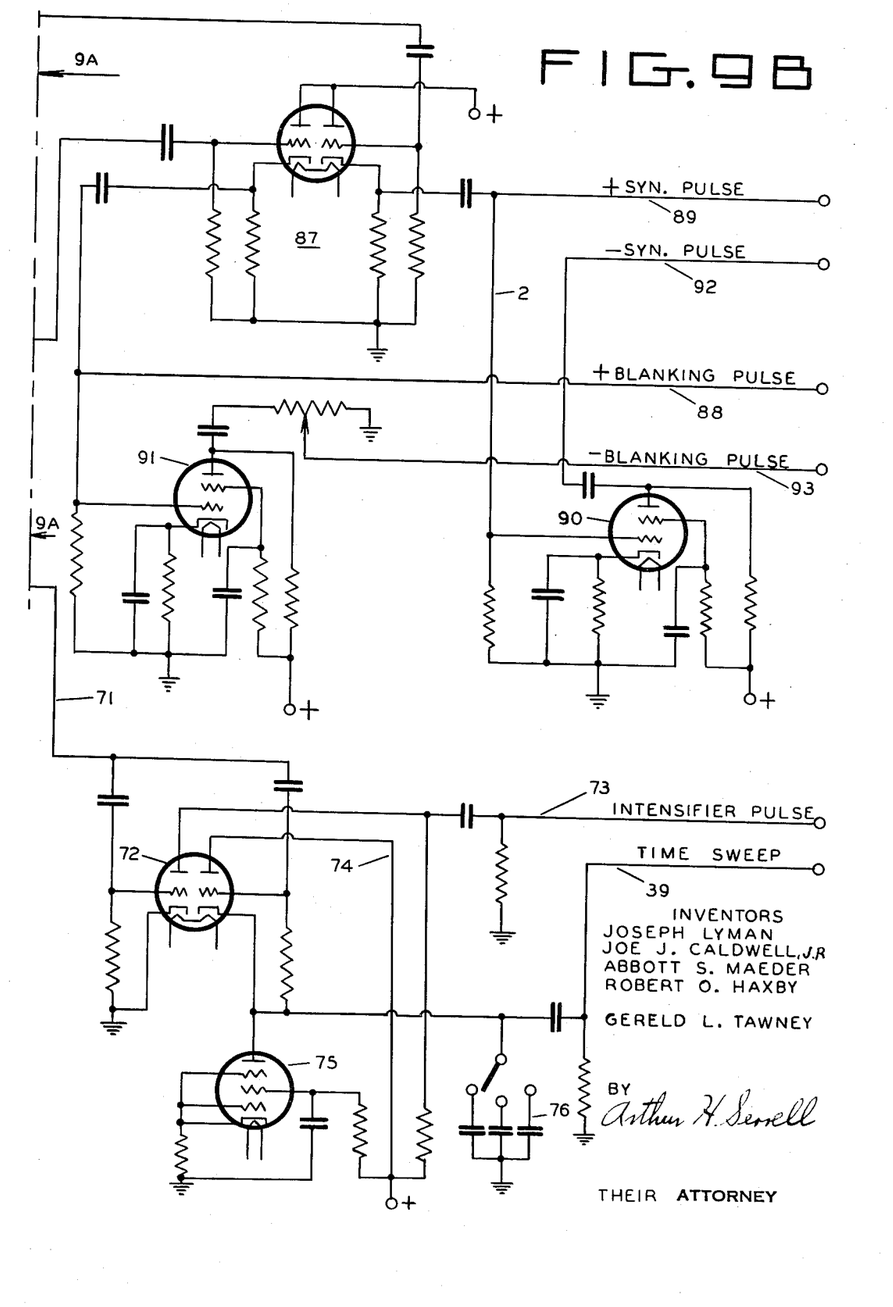

The synchronize and pulse generator 1 is shown in detail in Figs. 9A and 9B and comprises essentially a control oscillator 67 which produces a substantially sine wave that is fed over output lead 68 to the buffer and amplifier tube 69. This buffer tube serves to amplify the sine wave output of oscillator 67 and at the same time prevents this oscillator from being adversely affected by the load circuit. The output of tube 69 is supplied through lead 77 through a phase shifting network 78 to a double diode 79 which produces time spaced unidirectional pulses in output leads 80 and 81. Output lead 80 is connected to supply an amplifier 70 which amplifies the intermittent pulses from tube 79 and supplies an amplified version thereof over lead 71 to the clipper-amplifier 72 which converts the intermittent pulses into those having a square wave formation. The intermittent square wave pulses supplied by clipper-amplifier 72 pass over lead 73 for furnishing the intensifier voltage E of Fig. 10 to lead 37. The upper half of tube 72 acting as a cathode impedance is connected through lead 74 to a constant discharge tube 75 and connected condenser 76, thereby producing the time sweep voltage curve D of Fig. 10 that is supplied over leads 39 to the vertical deflecting coils 34.

The intermittent pulses supplied over leads 80 and 81 from double diode 79 are fed to an amplifier 82 the outputs of which are fed over leads 83 and 84 to pulse forming tubes 85 and 86. The peaked outputs of tubes 85 and 86 are supplied to an amplifier 87 which supplies a positive blanking pulse through lead 88 and a positive synchronizing pulse through lead 89, the latter pulse being fed to connected lead 2. Additional tubes 90 and 91 connected to leads 89 and 88, respectively, supply negative synchronizing pulses and negative blanking pulses through leads 92 and 93 respectively. Lead 22 of Fig. 1A is connected to lead 93 and lead 33 of Fig. 1A may be connected either to lead 93 or lead 88 depending on the nature of amplifier 32.

Figure 6:
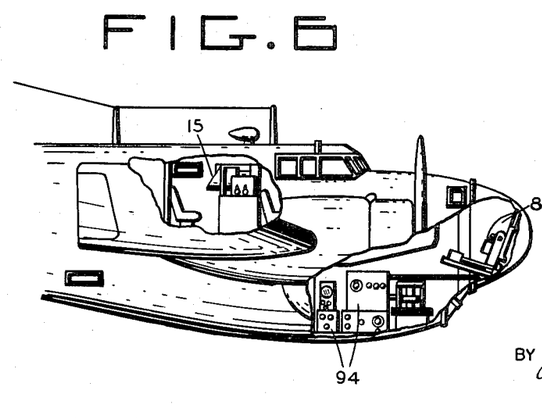
Fig. 6 is a fragmentary view with parts broken away illustrating one manner of installing the apparatus in use.

Fig. 6 illustrates a typical installation of the apparatus of the present invention in an airplane, the reflector 8 being installed preferably in the nose of the plane as shown, the various circuit elements being contained in the cabinets 94 and the cathode ray indicator 15 being in a position accessible to the bombardier.

Figures 7, 8:
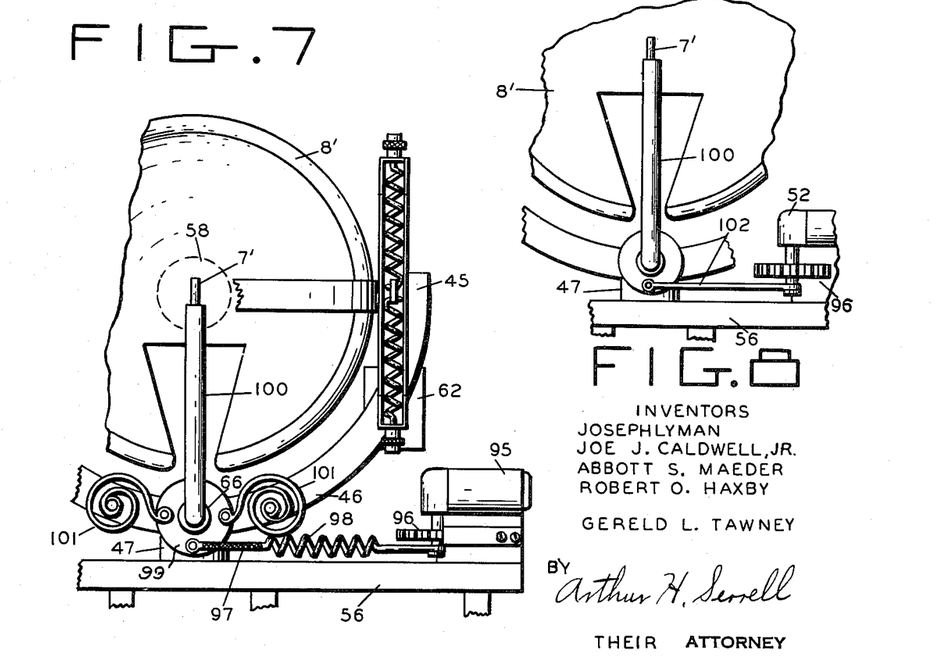
Fig. 7 is a front elevational view of a modified form of scanning means employing a moving antenna.
Fig. 8 is a fragmentary detail of a somewhat modified construction.

In Fig. 7 transverse azimuthal scanning is obtained by oscillating the antenna 7' rather than the reflector 8'. This is accomplished through use of a driving motor 95 acting through a crank disc 96, cable 97 and tension spring 98 connected to a collar 99 fixed on the concentric line 100 carrying the antenna 7'. Centralizing springs 101 of the spiral type are shown tending to centralize the antenna 7' with respect to reflector 8'. These springs are of such tension that antenna 7' oscillates at the natural frequency of the system and hence has a simple harmonic motion obtaining the advantages present in connection with the structure of Figs. 3 to 5. In the event that elevational scanning of reflector 8' is desired the same equipment may be used as is disclosed in connection with Figs. 3 to 5, similar parts being similarly numbered. A slight modification is shown in Fig. 8 wherein the springs 101 are eliminated and the concentric line 100 is directly driven by a link 102 connected with the crank disc 96. In this connection concentric line 100 may or may not be oscillated at its natural frequency.

Figures 11, 12:
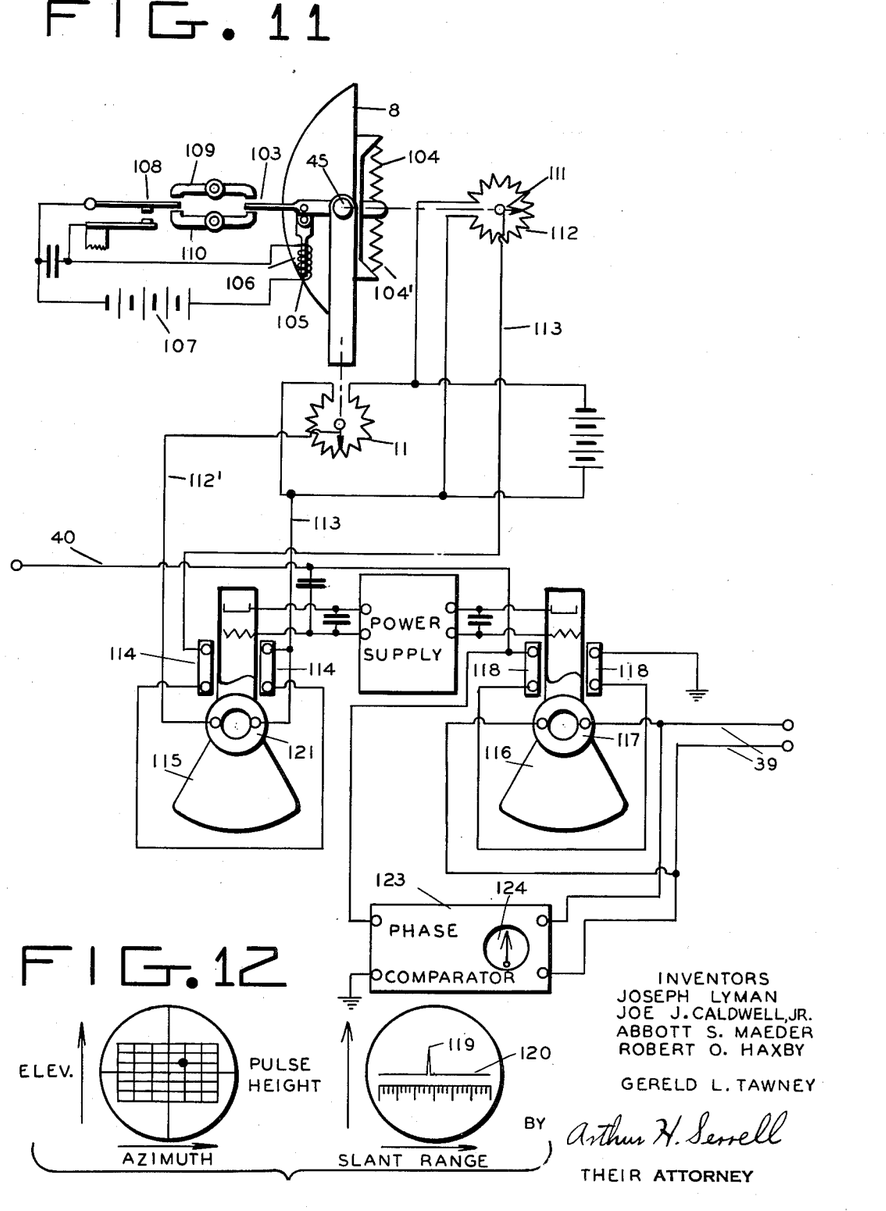
Fig. 11 illustrates the apparatus adapted for indicating elevational angles in addition to azimuthal and slant range indications.
Fig. 12 shows typical indications of the indicator faces.

The apparatus of Fig. 11 serves to indicate elevational angles of the target or objects scanned in addition to the azimuthal angle and slant range indication. In this figure a somewhat different type of vertical oscillating means is provided for the reflector 8. According to this figure one of the trunnions 45 has a transverse crank arm 103 fixed thereon. Opposed tension springs 104 and 104' connected with one end of the crank arm 103 tend to retain the reflector 8 in its vertical position shown in Fig. 11. The rear portion of crank arm 103 has an armature 105 pivoted thereon which is adapted to be actuated by a solenoid 106 energized in turn from a source 107 through contacts 108 actuated by snap switches 109 and 110. Thus, if reflector 8 is given an initial oscillatory movement as by manual manipulation, first snap switch 109 will be actuated by crank arm 103 to close contacts 108 thereby energizing solenoid 106 and effecting a downward pull upon plunger 105 to maintain the upward movement of reflector 8. After bar 103 moves downward a certain amount it will strike switch 110 which will act to open contacts 108 permitting centralizing springs 104 and 104' to turn reflector 8 downwardly so that this reflector moves at its natural resonant frequency determined by its mass and the constants of springs 104 and 104'. A potentiometer handle 111 is actuated from trunnion 45 and moves over a potentiometer 112 to supply vertical scanning potentials through leads 113 to the vertical deflected coil 114. The horizontal scanning of reflector 8 is illustrated as obtained in the same manner as disclosed in Figs. 3 to 5. Potentiometer 11 is employed for supplying azimuthal scanning potentials over leads 112' and 113 to the horizontal deflecting coils 121, coils 121 and 114 being associated with a cathode ray tube 115.

A second cathode ray tube indicator 116 is employed for supplying slant range data. The transverse deflecting coils 117 of this tube is connected by leads 39 to the time sweep voltage output of the synchronizer and pulse generator, this sweep being illustrated at D in Fig. 10. The vertical deflecting coils 118 of indicator 116 are connected to the output lead 40 of amplifier 32 so that a jog 119 is produced in the time sweep scanning line 120 corresponding to the slant range of the target as shown in the right portion of Fig. 12. The left portion of this figure shows a typical indication of tube 115. If desired, leads 39 and 40 may be connected to a phase comparator 123 of the type disclosed in co-pending application Serial No. 375,373 of James E. Shepherd now Patent No. 2,370,692 in which case the range can be read on a meter 124.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Object detector and locating apparatus comprising, means for intermittently producing ultra high frequency electromagnetic energy, antenna means for directionally radiating said electromagnetic energy into space, means for rotating said antenna means to scan a field of view, said antenna means also being adapted to receive energy reflected from remote objects, receiving means coupled to said antenna means, blocking means rendering such receiving means inoperative except during intervals between successive transmission periods, additional means for biasing said receiver off during the intermittent transmission periods of said antenna means, position indicating means, means for supplying scanning and time sweep potentials to said indicating means synchronously with the scanning operation of said antenna means, said receiving means being connected to said indicator to show the bearing and distance of objects upon the receipt of reflected electromagnetic energy from such objects.

2. In an object indicating and locating system of the character described, an ultra high frequency oscillator, a directional antenna suplied from said oscillator, means for causing said antenna to scan a field of view both in azimuth and elevation, a receiver connected to said antenna for receiving energy reflected from remote objects, a control oscillator, means synchronized by said control oscillator and connected to said ultra high frequency oscillator and said receiver for biasing said receiver off while supplying an exciting pulse to said oscillator, means included in the connection between said antenna and said receiver for further aiding in preventing the output of said oscillator from directly reaching said receiver, a cathode ray tube indicator, means actuated from said scanning means for applying scanning potentials to said cathode ray tube time sweep means synchronized by said control oscillator and connected to said cathode ray tube for supplying a time sweep potential thereto, the output of said receiver being connected for biasing the cathode ray of said indicator means upon the reception of said reflected radiation, whereby said cathode ray indicator means is caused to indicate the azimuthal and elevational angle positions of the objects scanned together with the slant range thereof.

3. In an object position indicating system, a pair of cathode ray tube indicators having horizontal and vertical ray deflecting means, scanning antenna means, pick-off means from said antenna means for supplying azimuthal and elevational deflecting potentials to the horizontal and vertical ray deflecting means of one of said indicators, time sweep means connected to said second indicator for supplying time sweep deflecting potentials to one of the ray deflecting means thereof and additional pick-off means from said antenna means for supplying deflecting potentials to the other of said ray deflecting means of said other indicator, whereby azimuth and elevation angles are shown on said first named indicator and range is shown on said second indicator.

4. In apparatus of the character described, an ultra high frequency transmitting oscillator, a super-heterodyne receiver, a radiator connected to said oscillator and said receiver, a pulse generator also connected to said oscillator and receiver for effecting alternate operation of the same, said receiver comprising an ultra high frequency local oscillator connected to said pulse generator to be biased off by the latter during operation of said transmitting oscillator, a crystal mixer connected to said antenna and said local oscillator for heterodyning the received and locally generated waves, an intermediate frequency amplifier connected to said crystal mixer for amplifying the output of said mixer, a detector connected to said intermediate frequency amplifier for detecting the output thereof, a video amplifier connected to said detector for amplifying the output of said detector, said video amplifier also being connected to said pulse generator to be biased off by the latter during operation of said transmitting oscillator, and a position indicator controlled by said video amplifier and pulse generator.

5. Apparatus of the character described in claim 4 wherein said position indicator comprises a cathode ray tube having plural ray deflecting means and a control electrode, one of said deflecting means being energized from said pulse generator, and said cathode ray tube having its control electrode connected to said video amplifier for excitation therefrom.

6. Object position indicating apparatus comprising, an ultra high frequency transmitter and cooperating receiver, a synchronizing pulse generator, means synchronized by said pulse generator and connected to said transmitter and receiver for rendering the same alternately operable, a scanning antenna connected to said transmitter for radiating waves generated by said transmitter and also connected to said receiver for collecting waves returnsd to said antenna from reflecting objects, indicator means, electrical pick-off potentiometer means connected with said antenna and with said indicator means for causing the latter to respond to the scanning movements of said antenna, time sweep means connected to said synchronizing pulse generator and to said indicator means for effecting a time sweep thereof initiated by said synchronizing pulse generator simultaneously with the operation of said transmitter, said receiver being connected to said indicator means for reproducing the bearings of an object as well as the slant range thereof, upon the receipt of such reflected waves.

7. In object position indicating apparatus of the character described for detecting and locating remote objects, a transmitter comprising a directional antenna, means for causing said directional antenna to scan a field of view, a cathode ray indicator, electrical potential pick-off means driven from said scanning means for supplying scanning potentials to said cathode ray indicator, a receiver interconnecting said directional antenna and said cathode ray indicator, a synchronizing pulse generator, means synchronized by said pulse generator and connected to said transmitter and receiver for alternately energizing the same, time sweep means synchronized by said synchronizing pulse generator and connected to said cathode ray indicator for supplying a time sweep potential thereto at right angles to said scanning potentials, the cathode ray beam of said indicator being normally biased off, said receiver serving upon the receipt of reflected energy from a remote object to bias the cathode ray indicator on and showing the angular position and distance of the remote object by use of angular position and distance scales extending at right angles to each other, said cathode ray indicator having vertical beam deflecting means energized from said time sweep means for effecting a vertical range sweep of the cathode ray of said indicator, said indicator also having transverse beam deflecting means connected to said electrical potential pick-off means for effecting a horizontal angular position sweep of the cathode ray of said indicator.

References Cited in the file of this patent

UNITED STATES PATENTS

| Number | Name | Date |
|---|---|---|
| 1,932,469 | Leib et al. | Oct. 31, 1933 |
| 2,028,498 | Clavier | Jan. 21, 1936 |
| 2,055,883 | Terry | Sept. 29, 1936 |
| 2,130,913 | Tolson | Sept. 20, 1938 |
| 2,138,966 | Hafner | Dec. 6, 1938 |
| 2,189,549 | Hershberger | Feb. 6, 1940 |
| 2,225,046 | Hunter | Dec. 17, 1940 |
| 2,227,598 | Lyman et al. | Jan. 7, 1941 |
| 2,231,929 | Lyman | Feb. 18, 1941 |
| 2,419,999 | Leck | May 6, 1947 |
| 2,449,976 | Busignies | Sept. 28, 1948 |
| 2,468,032 | Busignies | Apr. 26, 1949 |